(12) United States Patent
Wang et al.

(10) Patent No.: US 8,339,451 B2
(45) Date of Patent: Dec. 25, 2012

(54) IMAGE NAVIGATION WITH MULTIPLE IMAGES

(75) Inventors: Kong Qiao Wang, Beijing (CN); Qian Gang, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/001,424

(22) PCT Filed: Jun. 27, 2008

(86) PCT No.: PCT/EP2008/058290
§ 371 (c)(1),
(2), (4) Date: Dec. 26, 2010

(87) PCT Pub. No.: WO2009/155991
PCT Pub. Date: Dec. 30, 2009

(65) Prior Publication Data
US 2011/0105194 A1    May 5, 2011

(51) Int. Cl.
*H04N 7/18* (2006.01)
(52) U.S. Cl. ........ 348/130; 348/129; 348/136; 348/137; 382/115; 382/116; 382/117; 382/118; 382/119; 455/456.1; 455/457; 455/556.1
(58) Field of Classification Search .................. 455/566, 455/414.1, 415, 550.1
See application file for complete search history.

(56) References Cited

U.S. PATENT DOCUMENTS

| | | |
|---|---|---|
| 2005/0105803 A1 | 5/2005 | Ray |
| 2006/0018522 A1 | 1/2006 | Sunzeri |
| 2006/0050934 A1 | 3/2006 | Asai |
| 2006/0072811 A1 | 4/2006 | Porter et al. |
| 2006/0140455 A1 | 6/2006 | Costache et al. |
| 2006/0239515 A1 | 10/2006 | Zhang et al. |
| 2008/0052312 A1 | 2/2008 | Tang et al. |
| 2008/0068456 A1* | 3/2008 | Fujii et al. .................... 348/130 |
| 2008/0220750 A1* | 9/2008 | Steinberg et al. .......... 455/414.1 |

FOREIGN PATENT DOCUMENTS

EP    1669890 A    6/2006

OTHER PUBLICATIONS

International Search Report and Written Opinion of the International Searching Authority for PCT Application No. PCT/EP2008/058290, dated Mar. 30, 2009, 10 pages.

* cited by examiner

*Primary Examiner* — Dai A Phuong
(74) *Attorney, Agent, or Firm* — Harrington & Smith (57) ABSTRACT

There is disclosed a method in a mobile communications device, wherein the method comprises displaying a main image, selecting an object in the main image, displaying a plurality of object images comprising the selected object, selecting a target object image from the plurality of object images, and displaying a target candidate image associated with the target object image.

22 Claims, 5 Drawing Sheets

IMAGE NAVIGATION WITH MULTIPLE IMAGES

RELATED APPLICATION

This application was originally filed as Patent Cooperation Treaty Application No. PCT/EP2008/058290 filed Jun. 27, 2008.

TECHNICAL FIELD

The present invention relates to the field of mobile communications devices, and more particularly to displaying and selecting images in such mobile communications devices.

BACKGROUND

Mobile communications devices, e.g. mobile (cellular) telephones, for mobile telecommunication systems like GSM UMTS D-AMPS and COMA2000 have been used for many years.

Mobile communications devices, such as mobile, phones or personal digital assistants (PDAs) are today used for many different purposes. Typically, displays are used for output and keypads are used for input, particularly in the case of mobile communications devices, Mobile communications devices were previously used almost exclusively or voice communication with other mobile communications devices or stationary telephones. Gradually, the use of mobile communications devices has been broadened to include not just voice communication, but also various other services and applications such as www/wap browsing, video telephony, electronic messaging (e.g. SMS, MMS, email, instant messaging), digital image or video recording, FM radio, music playback, electronic games, calendar/organizer/time planner, word processing, etc.

For large devices, such as personal computers or laptop computers, large screens and more refined input mechanisms allow for a rich and intuitive user interface. At the same time, there has been a trend towards ever-increasing reduction of the size of mobile communications devices. One issue with user interfaces for small portable electronic devices is that reduction of size may lead to difficulties for entering data into the mobile communications devices. Displays may be small and user input may be limited. For devices with small displays and limited input means it might also be difficult to search and navigate through large quantities of information, particularly through large quantities of images.

Any improvement in the user experience of such devices have an impact on usability and attractiveness.

SUMMARY

An object of the disclosed subject-matter is to solve, or at least to reduce, the above mentioned problems. In particularly it is an object to provide an improved mobile communications device. It is a further object to provide an improved user interface. Yet a further object is to provide means for improved image navigation and/or search. Yet a further object is to provide improved image navigation and/or search in terms of efficient and intuitive image navigation and/or search.

Hence according to a first aspect there is provided a mobile communications device, comprising a display arranged for receiving a selection signal and based on the selection signal displaying a main image comprising at least one selectable object; a controller arranged for selecting one of the at least one selectable object in the main image; wherein the controller is further arranged for generating a search profile based on the selected object; the controller is further arranged for determining a plurality of candidate images from a plurality of database images utilizing, the search profile; the display is further arranged for displaying a plurality of object images in association with the main image, wherein the plurality of object images are associated with the candidate images, and wherein each one of the object images comprises a corresponding part of one of the candidate images; wherein the controller is further arranged for receiving a selection signal and based on the selection signal selecting a target object image from the plurality of object images; and the display is further arranged for displaying a target candidate image associated with the target object image.

The disclosed mobile communications device thus provides for displaying a plurality of object images representing selectable objects, wherein each object image corresponds to an individual image. Thus the disclosed mobile communications device allows for improved image search and image navigation. By separating candidate images from object images the disclosed subject-matter thus enables navigation and/or search for images comprising at least one selectable object.

The target object image may comprise the selected object.

The display may further be arranged for displaying the target candidate image as a new main image. Thus the disclosed mobile communications device allows for efficient search for images. The disclosed mobile communications device also allows for efficient selection of images.

The controller may further be arranged for cropping the plurality of candidate images, and the plurality of object images may be cropped versions of the plurality of candidate images. Thus the selected object may easily be identified.

The main image may comprise a plurality of selectable objects. Thus the disclosed mobile communications device allows for associating a main image with more than one selectable object. For example, an image may comprise more than one object that could be associated with images not comprising the same selectable object(s).

The controller may further be arranged for associating the plurality selectable objects with a plurality of object types and the main image may comprise at least two different object types. Thus the same main image may be associated with more than one search criteria. For example, a first object may be associated with a phone number and a second object may be associated with an Email address.

The mobile communications device may further comprise input means arranged for receiving input, and the object and the target object image may be selected by receiving input via the input means. Thus the object and the target object image may easily be selected. The input means may inter alia comprise a touch sensitive display, a keypad, a joystick, and the like.

The main image may be a photographic image and the object may be a face. The controller may further be arranged for performing face recognition, and the plurality of object images may be found by using face recognition.

The controller may further be arranged for associating at least one of the plurality of object images with contact information. The controller may further be arranged to be operatively connected to a database; and the controller may further be arranged for finding the plurality of candidate images by searching the database comprising the contact information.

According to a second aspect there is provided a mobile communications device, comprising means for displaying a main image comprising at least one selectable object; means for receiving a selection signal and based on the selection signal selecting one of the at least one selectable object in the main image; means for generating a search profile based on the selected object; means for determining a plurality of candidate images from a plurality of database images utilizing the search profile; means for displaying a plurality of object images in association with the main image, wherein the plurality of object images are associated with the candidate images, and wherein each one of the object images comprises a corresponding part of one of the candidate images; means for receiving a selection signal and based on the selection signal selecting a target object image from the plurality of object images; and means for displaying a target candidate image associated with the target object image.

According to a third aspect there is provided a user interface of a mobile communications device, wherein the user interface is arranged for displaying a main mage comprising at least one selectable object; receiving input pertaining to selection of one of the at least one selectable object in the main image; generating a search profile based on the selected object; determining a plurality of candidate images from a plurality of database images utilizing the search profile; displaying a plurality of object images in association with the main image, wherein the plurality of object images are associated with the candidate images, and wherein each one of the object images comprises a part of the candidate images; receiving input pertaining to selection of a target object image from the plurality of candidate images; and displaying a target candidate image associated with the target object image.

The main image has a first display size, each one of the plurality of object images has a second display size, and the candidate target image has a third display size, wherein the first display size, the second display size and the third display size may be different from each other. Thus by displaying the main image, the of the plurality of object images, and the candidate target image with different sizes it may be easy to distinguish between the different image types.

The first display size may be larger than the third display size and the third display size may be larger than the second display size.

The selected object may be enlarged when selected.

The plurality of object images may be displayed in a browse bar. Thus such a browse bar may provide for improved image navigation.

The plurality of object images may be displayed in an order, wherein the order may pertain to at least one factor from the group of date of image creation, date of image view, view frequency, a location tag, filename, a selectable object tag. Alternatively the order may be user defined. Thus such ordering improves the navigation in a set comprising a large number of object images.

According to a fourth aspect there is provided a method in a mobile communications device, wherein the method comprises displaying a main image comprising at least one selectable object; receiving input pertaining to selection of one of said at least one selectable object in said main image and selecting said at least one selectable object; generating a search profile based on the selected object; determining a plurality of candidate images from a plurality of database images utilizing the search profile; displaying a plurality of object images simultaneously with the main image, wherein the plurality of object images are associated with the candidate images, and wherein each one of the object images comprises a part of the candidate images; receiving input pertaining to selection of a target object image from said plurality of candidate images and selecting said target object image; and displaying a target candidate image associated with the target object image.

According to a fifth aspect there is provided a computer program stored on a computer-readable storage medium, which when executed on a processor of a mobile communications device performs a method according to the fourth aspect. Such a computer program product allows for efficient implementation of the disclosed method.

According to a sixth aspect there is provided a method in a mobile communications device, wherein the method comprises displaying a main mage; selecting an object in the main image; displaying a plurality of object images comprising the selected object; selecting a target object image from the plurality of object images; and displaying a target candidate image associated with the target object image.

The plurality of selectable objects may be associated with a plurality of object types and the main image may comprise at least two different object types. The types may be at least two types from the group of faces, vehicles, buildings, animals, devices.

The object and the target object image ray be selected by receiving user input.

The main image may be a photographic image and the object may be a face. The plurality of object images may be found by using face recognition.

At least one of the plurality of object images may be associated with contact information. The plurality of object images may be found by searching a database comprising the contact information.

According to a seventh aspect there is provided a computer program stored on a computer-readable storage medium, which when executed on a processor of a mobile communications device performs a method according to the sixth aspect. Such a computer program product allows for efficient implementation of the disclosed method.

The second, third, fourth, fifth, sixth and seventh aspects may generally have the same features and advantages as the first aspect.

Some of the embodiments of the invention provide for a novel and alternative way of searching for image objects in images, in a mobile communications device. It is an advantage with some embodiments of the invention that they provide for improved usage of the available display screen area of the display of the mobile communications device. Furthermore, it is an advantage with some embodiments of the invention that they provide a user-friendly and intuitive way of searching for image objects in the mobile communications device. Moreover, it is an advantage with some embodiments of the invention that they allow for enhanced navigation when searching for and displaying image objects and images in the mobile communications device.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

The present invention will now be described more full hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
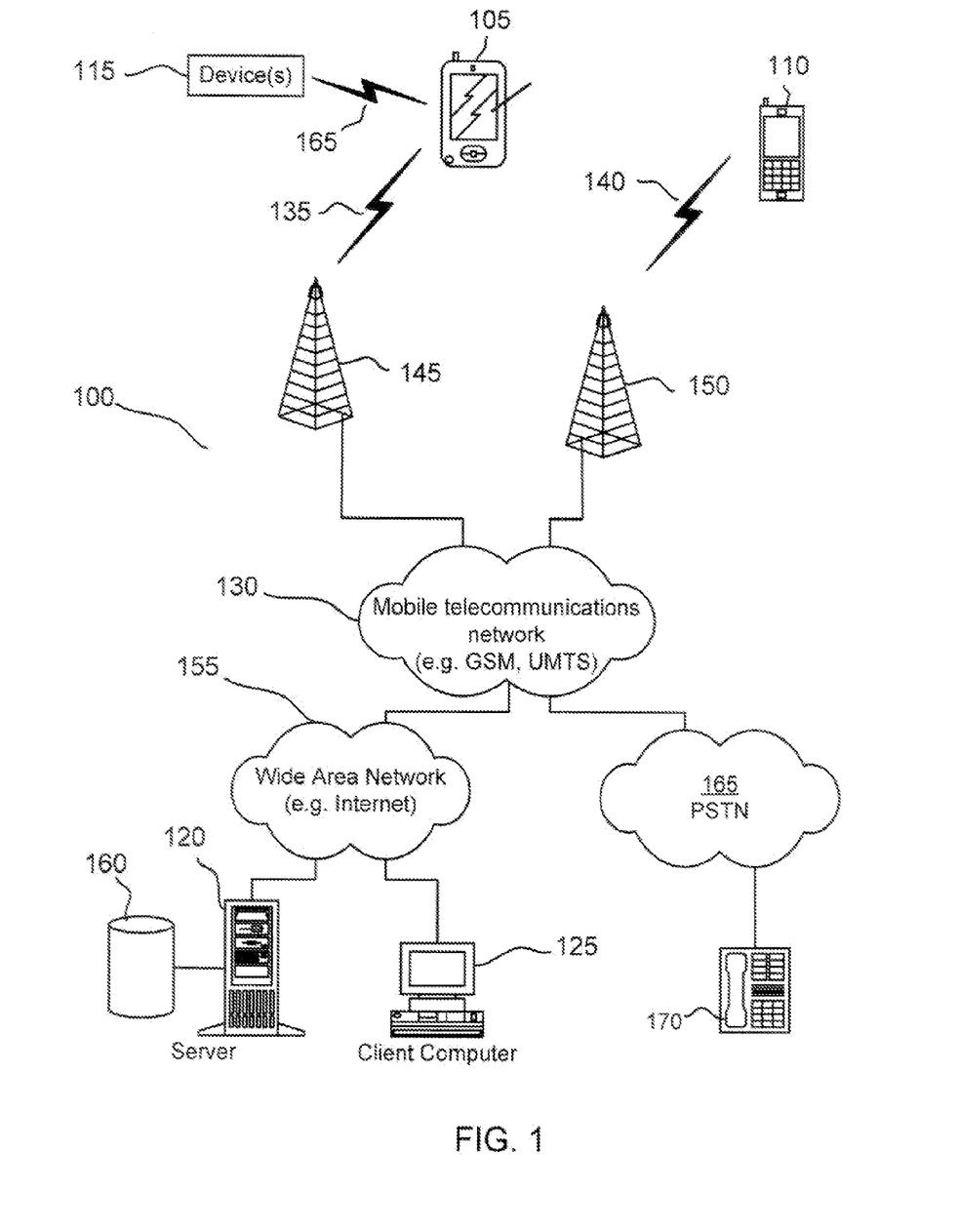
FIG. 1 is a schematic illustration of a cellular telecommunication system, as an example of an environment in which the present invention may be applied.

FIG. 1 illustrates an example of a cellular telecommunication system 100 in which the invention may be applied. In the telecommunication system 100 of FIG. 1, various telecommunication services such as cellular voice calls, www/wap browsing, cellular video calls, data calls, facsimile transmissions, music transmissions, still image transmissions, video transmissions, electronic message transmissions, electronic positioning information, and electronic commerce may be performed between a mobile communications device 105 and other devices, such as another mobile communications device 110, a local device 115, a computer 120, 125 or a stationary telephone 170. It is to be noted that for different embodiments of the mobile communications device 105 and in different situations, different ones of the telecommunication services referred to above may or may not be available; the invention is not limited to any particular set of services in this respect.

The mobile communications devices 105, 110 may be operatively connected to a mobile telecommunication network 130 through RF links 135, 140 via base stations 145, 150. The base stations 145, 150 may be operatively connected to the mobile telecommunication network 130. The mobile telecommunication network 130 may be in compliance with any commercially available mobile telecommunication standard, such as GSM. UMTS, D-AMPS, CDMA2000, FOMA and TD-SCDMA.

The mobile telecommunication network 130 may be operatively connected to a wide area network 155, which may be Internet or a part thereof. An Internet server 120 may have a data storage 160 and may be operatively connected to the wide area network 155, as is an Internet client computer 125. The server 120 may host a www/wap server capable, of serving www/wap content to the mobile communications devices 105, 110.

A public switched telephone network (PSTN) 165 may be operatively connected to the mobile telecommunication network 130 in a familiar manner Various telephone terminals, including the stationary telephone 170, may be operatively connected to the PSTN 165.

The mobile communications device 105 may also be capable of communicating locally via a local link 175 to one or more local devices 115. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, and communication aided by the infrared data association (IrDA) standard, etc.

Figure 2:
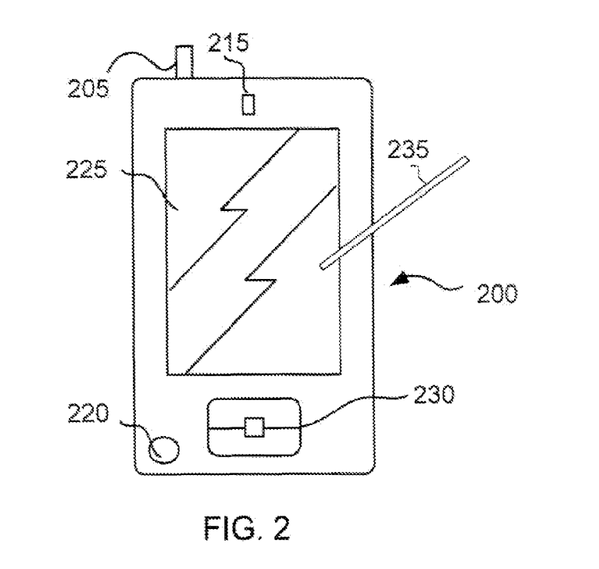
FIG. 2 is a schematic front view illustrating a mobile communications device according to an embodiment.

An embodiment 200 of the mobile communications device 105 is illustrated in more detail in FIG. 2. The mobile communications device 200 may comprise an antenna 205, a camera (not shown), a speaker or earphone 215, a microphone 220, a display 225 (e.g. a touch sensitive display) and a set of keys 230 which may include a keypad (not shown) of common ITU-T type (alpha-numerical keypad representing characters "0"-"9", "*" and "#") and certain other keys such as soft keys, and a joystick or other type of navigational input device, including input devices specifically designed to facilitate easy scrolling of display content. Such a user input device may be a rotational input device or a touch sensitive device on which a user applies pressure along a path etc., using e.g. a stylus 235. The mobile communications device 200 may be e.g. a mobile phone, a personal digital assistant (PDA), a portable media player, or the like.

The internal components 300, software and protocol structures of the mobile communications device 105, 200 will now be described with reference to FIG. 3. The mobile communications device may have a controller 331 which is responsible for the overall operation of the mobile communications device and is preferably implemented by any commercially available CPU (Central Processing Unit), DSP (Digital Signal Processor) or any other electronic programmable logic device. The controller 331 may have associated electronic memory 332 such as RAM memory, ROM memory, EEPROM memory, flash memory, or any combination thereof. The memory 332 may be used for various purposes by the controller 331, one of them being for storing data and program instructions for various software in the mobile communications device. The memory 332 may further store one or more dictionaries comprising words. The memory 332 may further store a plurality of metadata objects, such as video clips, picture clips, audio clips, text clips, and so on.

The software may include a real-time operating system 336 drivers for a man-machine interface (MMI) 339, an application handier 338 as well as various applications. The applications can include a messaging application 340 for sending and receiving SMS, MMS or email, a media player application 341, as well as various other applications 342, such as applications for voice calling, video calling, web browsing, an instant messaging application, a phone book application, a calendar application, a control panel application, a camera application, one or more video games, a notepad application, a positioning application, an information extracting application, etc.

The MMI 339 may also include one or more hardware controllers, which together with the MMI drivers cooperate with the display 323, 225, keypad 324, 230, as well as various other I/O devices 329 such as microphone 220, speaker 215, vibrator, ringtone generator, LED indicator, etc. As is commonly known, the user may operate the mobile communications device through the man-machine interface thus formed.

The software may also include various modules, protocol stacks, drivers, etc., which are commonly designated as 337 and which provide communication services such as transport, network and connectivity) for an RF interface 333, and optionally a Bluetooth interface 334 and/or an IrDA interface 335 for local connectivity. The RF interface 333 may comprise an internal or external antenna as well as appropriate radio circuitry for establishing and maintaining a wireless link to a base station (e.g. the link 135 and base station 145 in FIG. 1). As is well known to a person skilled in the art, the radio circuitry may comprise a series of analogue and digital electronic components, together forming a radio receiver and transmitter. These components may include, e.g., band pass filters, amplifiers, mixers, local oscillators, low pass filters, AD/DA converters, etc.

Figure 3:
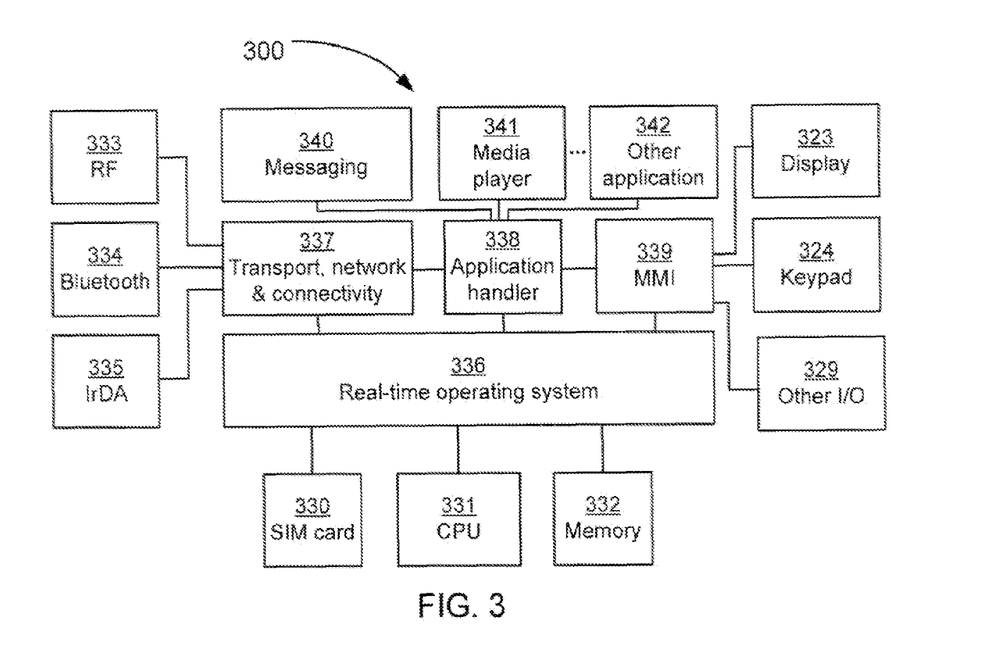
FIG. 3 is a schematic block diagram representing an internal component, software and protocol structure of a mobile communications device according to an embodiment.

The mobile communications device 105, 200 as represented by the internal components 300 in FIG. 3 may also have a SIM card 330 and an associated reader. As is commonly known, the SIM card 330 comprises a processor as well as local work and data memory.

Figure 4A:
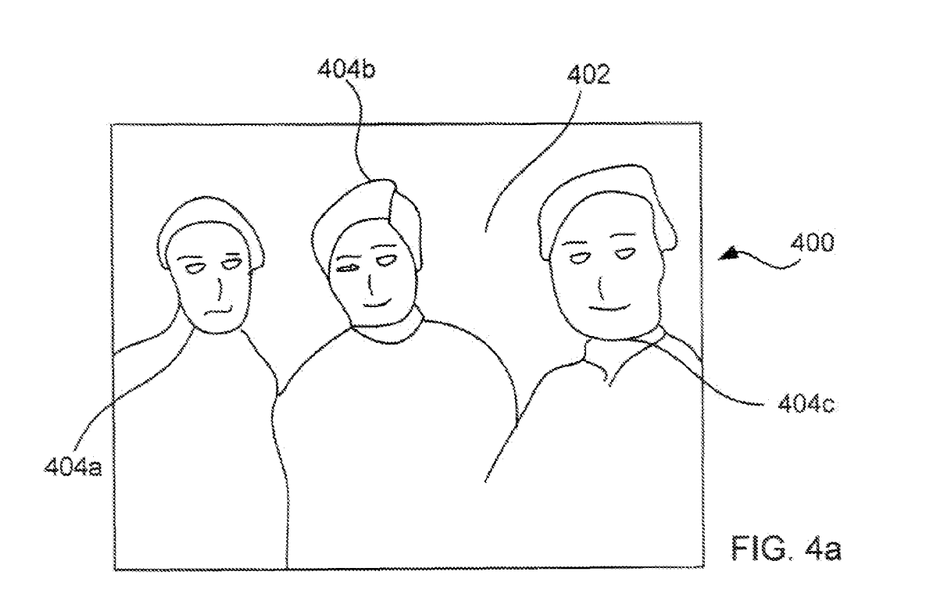
FIGS. 4a-4d illustrate a sequence of display views of a mobile communications device according to an embodiment.

Continuing now with FIG. 4a which illustrates a schematic display view of a display 400, such as the display 225 of the mobile communications device 105, 110, 200 of FIGS. 1 and 2, The display view may thus be defined as defining what is shown in the display.

The display 400 is arranged to display a main image 402. The main image 402 may inter alia be a photographic image. Alternatively the main image 402 may be a computer-generated image. The main image 402 may be comprised in a memory 332 of the mobile communications device 105, 110, 200.

The main image 402 may further comprise one or more selectable objects 404a-404c. The main image 402 may thus comprise a plurality of selectable objects 404a-404c. If the main image is a photographic image one or more of the selectable objects 404a-404c may be a face. In case the main image 402 comprises a plurality of selectable objects, the plurality of selectable objects may be associated with a plurality of object types. For example the object types may be types from the group of faces, vehicles, buildings, animals, devices. This the main image 402 may be a photographic image comprising of different selectable objects 404a-404c. In the illustrative example of FIG. 4a the main image 402 comprises a first face associated with a first selectable object 404a, a second face associated with a second selectable object 404b, and third face associated with a third selectable object 404c.

The one or more selectable objects 404a-404c may be selected by a user. Thus user input means may be arranged for receiving user input, and wherein the object may be selected by receiving user input via the user input means. The user interface of the mobile communications device may thus receive user input pertaining to selection of one of the at least one selectable objects 404a-404c in the main image 402. The user may inter alia select one of the selectable objects 404a-404c by operating the user interface. For example, if the display view 402 is associated with a touch sensitive display arranged for receiving user input one of the selectable objects 404a-404c may be selected by a user tapping, or clicking, on the desired object 404a-404c with a stylus 235. The user may also select a desired object by operating a keypad 230, 324, or joystick of the mobile communications device.

The display 400 may further comprise a plurality of items, such as one or more soft keys, a battery indicator, an antenna reception strength indicator, an indicator of time and/or date, an alarm indicator, and the like (not shown).

Figure 4B:
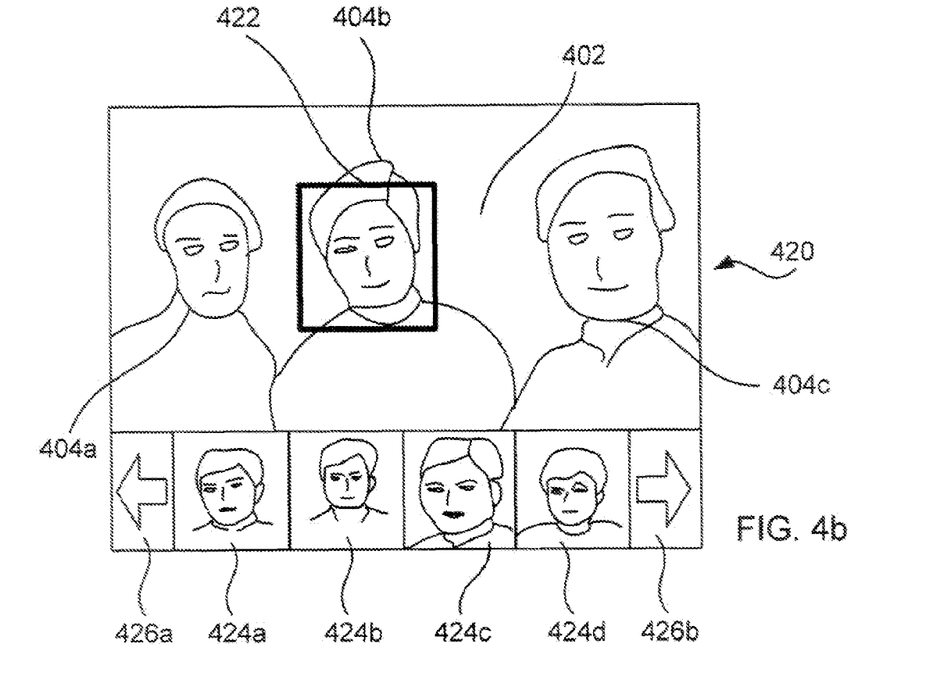

FIG. 4b illustrates a schematic display view of a display 420, such as the display 225 of the mobile communications device 105, 110, 200 of FIGS. 1 and 2 and similar to the display 400 of FIG. 4a. The display 420 this comprises the main image 402 comprising the one or more selectable objects 404a-404c. In the illustrative example of FIG. 4b the second selectable object 404b has been selected as indicated by a selection indicator 422. The selection indicator 422 may thus enclose at least part of the selected selectable object. Alternatively the selected selectable object may be highlighted in any known manner.

The display 420 further comprises a plurality of object images 424a-424d in association with the main image 402. Each one of the object images 424a-424d comprises a version of the selected selectable object. For example, the object images 424a-424d may comprise the same photographic object that is associated with the selectable object 404a-404c. The object images 424a-424d may thus be comprised in a browse bar. That is, if the selectable object 404a-404c is a face, the object images 424a-424d may be other images comprising the face. In a case the display 420 is not arranged to display all object images simultaneously the display 420 may also comprise one or more navigation actuators 426a-426b. Thus by operation one of the navigation actuators 426a-426b a user may scroll the entire set of object images 424a-424d. For example if a user operates a "left" navigation actuator 426a the displayed object images 424a-424d may be shifted one step to the left. Alternatively, if a user operates a "right" navigation actuator 426b the displayed object images 424a-424d may be shifted one step to the right.

The object images 424a-424d may be displayed in an order. The order may pertain to at least one factor from the group of date of image creation, date of image view, view frequency, a location tag, filename, a selectable object tag. The date of date of image creation may thus pertain to date of capture or date of editing the image. The date of image view may pertain to the previous date during which the image was displayed or selected. The view frequency may pertain to how often the images is displayed or selected. The location tag may pertain to where the image was captured. The filename may pertain to the name of the computer file of the image. The selectable object tag may be a name or address or contact information of a person or object associated with a selectable object in the image.

The object images 424a-424d may be found as follows. Firstly a search profile based on the selected object may be generated. Secondly the search profile may be utilized for determining a plurality of candidate images from a plurality of database images. Thirdly the candidate images may be associated with the plurality of object images. Each one of the object images may comprise a corresponding part, of one of the candidate images. For example, the object images may be cropped versions of the candidate images.

In case the main image 402 is a photographic image and the selectable object is a face the plurality of candidate images may be found by using face recognition. Face recognition is per se known in the art and will thus not be further elaborated upon here.

In case the selectable object is associated with contact information and at least one of the plurality of candidate images is associated with contact information the plurality of candidate images may found by searching a database comprising the contact information. The contact information may e.g. be a telephone number, an Email-address, a geographical location, and the like. For example in such a case, the user may search for candidate images associated with objects or persons associated with the same street as the selected object. Alternatively, if the selected object is a building the user may search for candidate images comprising buildings in the same city. Alternatively, if the selected object is a person the user may search for candidate images associated with the same Email-address as the user.

The database may be a database stored locally in a memory 332 of the mobile communications device 105, 110, 200 or in the SIM card 330. Alternatively the database may be a remote database stored in a storage facility 160 of a server 120 or in a local device 115. Thus, alternatively, when operatively connected, e.g. via wireless links 135, 165, to a remote database, the mobile communications device 105, 110 200 may send a request to the remote database, wherein the request pertains to the above disclosed search criterion. For example, the request may pertain to contact information. For example, the request may pertain to images associated with a specific phone number, street address, building, and the like.

Figure 4C:
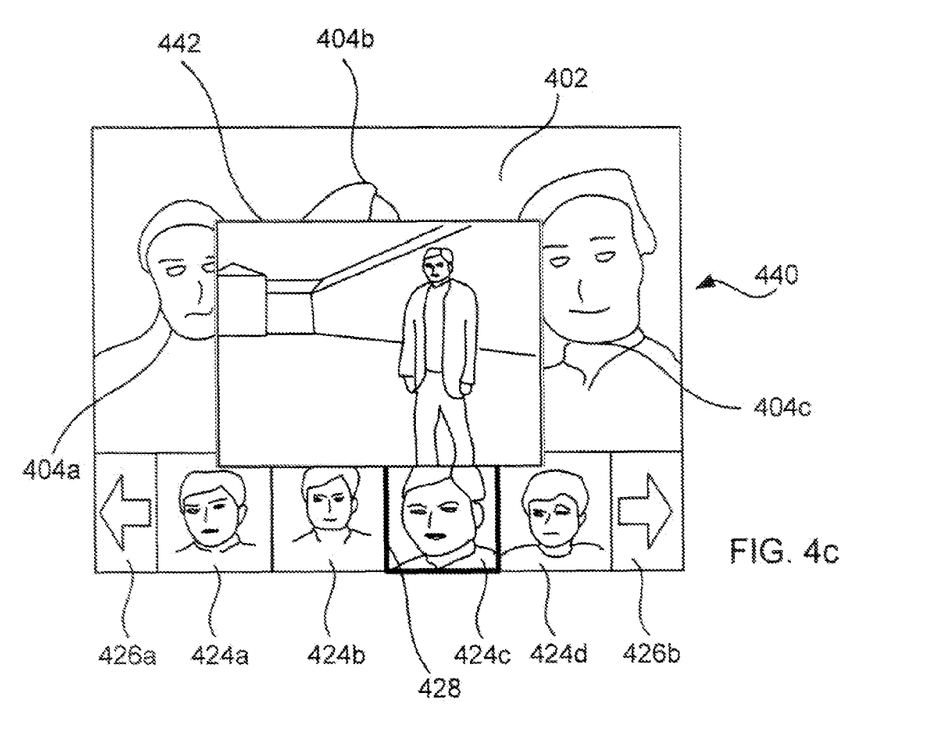

FIG. 4c illustrates a schematic display view of a display 440, such as the display 225 of the mobile communications device 105, 110, 200 of FIGS. 1 and 2 and similar to the displays 400 and 420 of FIGS. 4a and 4b, respectively. The display 440 further comprises a target candidate image 442. The target candidate image 442 may be displayed by selecting one of the displayed object images 424a-424d. The target candidate image 442 may be selected for display by the processor 331, e.g. by receiving input. The input may be user input received by the MMI 339. For example if the display 225 is a touch sensitive display the user input may pertain to the display screen 225 being tapped. Similarly the user input may pertain to a dragging movement on the display 225. For example, a user may select a target candidate image 442 by tapping on the associated object image 424a-d (in the illustrative example object image 424c). Alternatively a user may select a target candidate image 442 by performing a dragging movement starting at the associated object image 424a-d (in the illustrative example object image 424c) and ending on an area outside said selected object image 424a-d. Alternatively the target candidate image 442 may be selected by receiving input from the keypad 230, 324.

In the illustrative example of FIG. 4c the object image 424c has been selected as indicated by the selection indicator 428. The selection indicator 428 may thus enclose at least part of the selected object image. Alternatively the selected object image may be highlighted in any known manner.

As a result of the selection a target candidate image 442 is shown. The target candidate image 442 is associated with the selected object image 424c. For example, the selected object image 424c may be a cropped version of the candidate image 442 and/or the selected object image 424c may have a lower pixel resolution than the target candidate image 442. That is, the target candidate image 442 may comprise details and objects not visible in the selected object image 424c. in addition, the selected object may be enlarged when selected.

It may be said that the main image 402 has a first display size, that each one of the plurality of candidate images 424a-d has a second display size, and that the target candidate image 442 has a third display size. The first display size, second display size and third, display size may be different from each other. For example, the first display size may be larger than the third display size. The third display size may be larger than the second display size.

The target candidate image 442 may be selected similarly to receiving selection of an object image 424a-d and as a result displaying a target candidate image 442 as disclosed above. As a result of selecting the target candidate image 442, the target candidate image 442 may be displayed as a new main image, as will be illustrated below with reference to FIG. 4d.

Figure 4D:
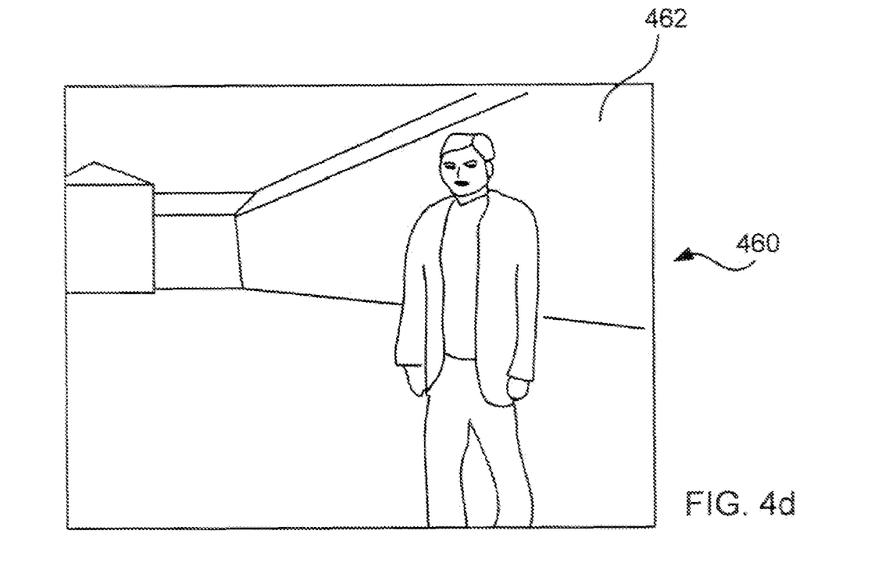

FIG. 4d illustrates a schematic display view of a display 460, such as the display 225 of the mobile communications device 105, 200 of FIGS. 1 and 2 and similar to the displays 400, 420 and 440 of FIGS. 4a, 4b and 4c, respectively. The display 460 comprises a new main image 462. This new image is the result of selecting image the target candidate image 442.

Thus the target candidate image 442 may be displayed as a new main image 462. Since the new main image 462 has been selected from an object image 424a-d (which comprises a selectable object) the new main image 462 comprises at least one selectable object (not shown).

According to an embodiment the display 225 of the mobile communications device 105, 110, 200 is operated in a sequence according to the view of the display 400 of FIG. 4a followed by the view of the display 420 of FIG. 4b followed by the view of the display 440 of FIG. 4c followed by the view of the display 460 of FIG. 4d.

According to an embodiment the sequence be repeated by selecting a selectable object in the new main image.

Figure 5:
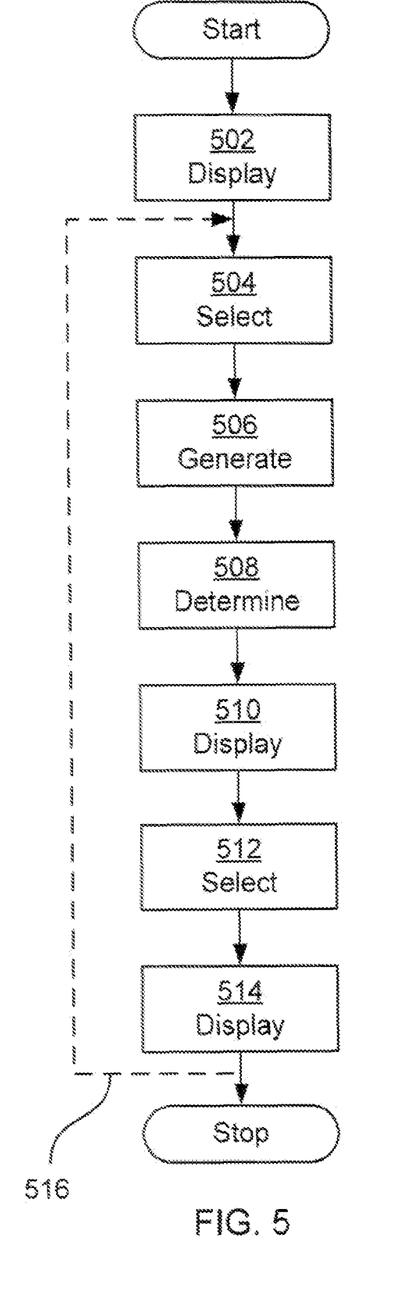
FIG. 5 is a flowchart for a method in a mobile communications device according to an embodiment.

FIG. 5 is a flowchart for a method in a mobile communications device such as the mobile communications device disclosed in connection with the description of FIGS. 1-4. The method comprises, in a step 502, displaying a main image comprising at least one selectable object. The method further comprises, in a step 504, selecting one of the at least one selectable object in the main image. A search profile based on the selected object is generated in a step 506. Further, in a step 508 a plurality of candidate images are determined from a plurality of database images by utilizing the search profile.

The method comprises, in a step 510, displaying a plurality of object images simultaneously with the main image, wherein the plurality of object images are associated with the candidate images, and wherein each one of the object images comprises a part of the candidate images.

A target object image from the plurality of candidate images is then selected in a step 512.

A target candidate image associated with the target object image images is then displayed in a step 514.

According to an embodiment the method may be repeated, in a step 516, by selecting a selectable object in the new main image.

Figure 6:
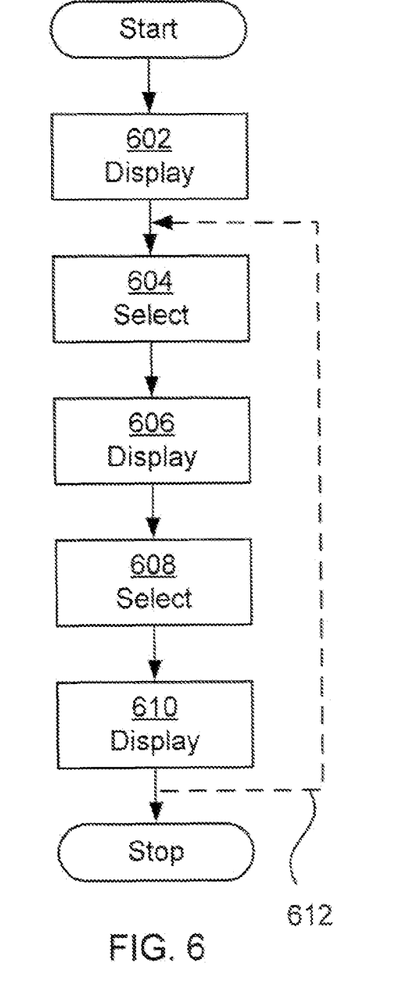
FIG. 6 is a flowchart for a method in a mobile communications device according to an embodiment.

FIG. 6 is a flowchart for a method in a mobile communications device such as the mobile communications device disclosed in connection with the description of FIGS. 1-4. The method comprises, in a step 602, displaying a main image.

Further, an object in the main image is selected in a step 604. The main image may comprises a plurality of selectable objects. The main image may be a photographic image and the object may be a face.

In a step 606 a plurality of object images comprising the selected object are displayed. The plurality of object images may be cropped versions of a plurality of candidate images. The plurality of selectable objects may be associated with a plurality of object types. The main image may comprise at least two different object types. The types may be at least two types from the group of faces, vehicles, buildings, animals, devices. The plurality of object images may be found by using face recognition. The plurality of object images may be displayed in an order, wherein the order pertains to at least one factor from the group of date of image creation, date of image view, view frequency, a location tag, filename, a selectable object tag.

The method further comprises selecting, in a step 608, a target object image from the plurality of object images. At least one of the plurality of object images may be associated with contact information. The plurality of object images may be found by searching a database comprising the contact information.

A target candidate image associated with the target object image is then displayed in a step 610. The object and the target object image may be selected by receiving user input.

According to an embodiment the method may be repeated, in a step 612, by selecting a selectable object in the new main image.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communications device, comprising
a display configured to receive a selection signal and based on said selection signal displaying a main image comprising at least one selectable object;
a controller configured to select one of said at least one selectable object in said main image;
said controller is further configured to generate a search profile based on said selected object;
said controller is further configured to determine a plurality of candidate images from a plurality of database images utilizing said search profile;
said display is further configured to display a plurality of object images in association with said main image, wherein said plurality of object images are associated with said candidate images, wherein each one of said object images comprises a part of a corresponding one of said candidate images which is less than a whole of said corresponding one of said candidate images, and further wherein the object images are associated with the selectable object;
said controller is further configured to receive a, selection signal corresponding to a selection of one of said object images and, based on said selection signal, selecting a target object image from said plurality of object images; and
said display is further configured to display a target candidate image associated with said target object image, where said target candidate image is said corresponding one of said candidate images, and where said target object image, and said target candidate image, and said plurality of object images are displayed at a same time on the display.

2. The mobile communications device according to claim 1, wherein said target object image comprises said selected object.

3. The mobile communications device according to claim 1, wherein said display is further configured to display said target candidate image as a new main image.

4. The mobile communications device according to claim 1, wherein said controller is further configured to crop said plurality of candidate images, and wherein said plurality of object images are cropped versions of said plurality of candidate images.

5. The mobile communications device according to claim 1, wherein said main image comprises a plurality of selectable objects.

6. The mobile communications device according to claim 5, wherein
said controller is further configured to associate said plurality of selectable objects with a plurality of object types and wherein said main image comprises at least two different object types.

7. The mobile communications device according to claim 1 further comprising
an input device configured to received input, and wherein said object and said target object image are selected by receiving user input via said user input means.

8. The mobile communications device according to claim 7, wherein
said controller is further configured to perform face recognition, and wherein
said plurality of object images are found by using face recognition.

9. The mobile communications device according to claim 1, wherein said main image is a photographic image and said object is a face.

10. The mobile communications device according to claim 1, wherein said controller is further configured to associate at least one of said plurality of object images with contact information.

11. The mobile communications device according to claim 10, wherein
said controller is further configured to be operatively connected to a database; and wherein
said controller is further configured to find said plurality of candidate images by searching said database comprising said contact information.

12. The mobile communications device according to claim 1:
where said display is further configured to display said main image at the same time as said target object image, and said target candidate image, and said plurality of object images, and
where said target object image, said target candidate image, and/or said plurality of object images are located, at least partially, over said main image.

13. A method comprising:
displaying a main image comprising at least one selectable object;
receiving input pertaining to selection of one of said at least one selectable object in said main image, and selecting said one of said at least one selectable object;
generating a search profile based on said selected object;
determining a plurality of candidate images from a plurality of database images utilizing said search profile;
displaying a plurality of object images in association with said main image, wherein said plurality of object images are associated with said candidate images, and wherein each one of said object images comprises a part of said candidate images which are each less than a whole of a corresponding one of said candidate images, and further wherein the object images are associated with the selectable object;
receiving input pertaining to selection of a target object image from said plurality of candidate images and selecting said target object image; and
displaying a target candidate image associated with said target object image, where said target object image, and said target candidate image, and said plurality of object images are displayed at a same time.

14. The method according to claim 13, wherein said target object image comprises said selected object.

15. The method according to claim 13, wherein said target candidate image is displayed as a new main image.

16. The method according to claim 13 further comprising:
displaying said main image at the same time as said target object image, and said target candidate image, and said plurality of object images, and
where said target object image, said target candidate image, and/or said plurality of object images are located, at least partially, over said main image.

17. A non-transitory computer program stored on a computer-readable storage medium, which when executed on a processor of a mobile communications device performs the method according to claim 13.

18. A method comprising
displaying a main image;
selecting an object in said main image;
displaying a plurality of object images comprising said selected object;
selecting a target object image from said plurality of object images; and
displaying a target candidate image associated with said target object image;
where said main image, said plurality of object images and said target candidate image are displayed at a same time, and
where said target candidate image and/or said plurality of object images are located, at least partially, over said main image.

19. The method according to claim 18, wherein said plurality of object images are cropped versions of a plurality of candidate images.

20. The method according to claim 18, wherein said main image comprises a plurality of selectable objects.

21. The method according to claim 20, wherein
said plurality of selectable objects are associated with a plurality of object types and wherein
said main image comprises at least two different object types.

22. A non-transitory computer program stored on a computer-readable storage medium, which when executed on a processor of a mobile communications device performs the method according to claim 18.

* * * * *